US011294072B2

(12) United States Patent
Yamazaki

(10) Patent No.: US 11,294,072 B2
(45) Date of Patent: Apr. 5, 2022

(54) METHOD, DEVICE AND SERVER FOR ESTIMATION OF IFB CALIBRATION VALUE

(71) Applicant: PANASONIC INTELLECTUAL PROPERTY MANAGEMENT CO., LTD., Osaka (JP)

(72) Inventor: Yasuhisa Yamazaki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 295 days.

(21) Appl. No.: 16/481,675

(22) PCT Filed: Nov. 7, 2017

(86) PCT No.: PCT/JP2017/040031
§ 371 (c)(1),
(2) Date: Jul. 29, 2019

(87) PCT Pub. No.: WO2018/146876
PCT Pub. Date: Aug. 16, 2018

(65) Prior Publication Data
US 2020/0003905 A1    Jan. 2, 2020

(30) Foreign Application Priority Data
Feb. 10, 2017  (JP) .............................. JP2017-023287

(51) Int. Cl.
G01S 19/43          (2010.01)
G01S 19/07          (2010.01)
(Continued)

(52) U.S. Cl.
CPC .............. *G01S 19/43* (2013.01); *G01S 19/07* (2013.01); *G01S 19/51* (2013.01); *G01S 19/073* (2019.08);
(Continued)

(58) Field of Classification Search
CPC .......... G01S 19/43; G01S 19/07; G01S 19/11; G01S 19/51; G01S 19/00; G01S 19/40; G01S 19/12; G01S 19/073
(Continued)

(56) References Cited

U.S. PATENT DOCUMENTS 6,353,412 B1* 3/2002 Soliman ................. G01S 19/41
                                                342/387
7,619,559 B2* 11/2009 DiEsposti ............... G01S 19/05
                                                342/357.42
(Continued)

FOREIGN PATENT DOCUMENTS

JP          10-253734          9/1998

OTHER PUBLICATIONS

International Search Report issued in International Pat. Appl. No. PCT/JP2017/040031, dated Jan. 30, 2018.
(Continued)

Primary Examiner — Chuong P Nguyen
(74) Attorney, Agent, or Firm — Greenblum & Bernstein, P.L.C.

(57) ABSTRACT

According to the present application, when an inter frequency bias (IFB) calibration value, which corresponds to a machine type ID of a reference station, is not stored in a storage, a processor executes a Real Time Kinematic (RTK) calculation by using reference station-positioning data and positioning terminal-positioning data, calculates a positioning solution, and causes the storage to store the reference station-positioning data and the positioning terminal-positioning data. The processor executes, after completing a positioning processing, an estimation processing of the IFB calibration value by using the reference station-positioning data and the positioning terminal-positioning data which are stored in the storage.

10 Claims, 6 Drawing Sheets

(51) Int. Cl.
*G01S 19/51* (2010.01)
*G01S 19/11* (2010.01)
*G01S 19/40* (2010.01)
*G01S 19/12* (2010.01)

(52) U.S. Cl.
CPC .............. *G01S 19/11* (2013.01); *G01S 19/12* (2013.01); *G01S 19/40* (2013.01)

(58) Field of Classification Search
USPC .... 342/352, 357.26, 357.34, 357.44, 357.23, 342/357.48, 357.49
See application file for complete search history.

(56) References Cited

U.S. PATENT DOCUMENTS

| | | | | |
|---|---|---|---|---|
| 7,711,480 | B2* | 5/2010 | Robbins | G01C 15/00 701/471 |
| 9,958,550 | B2* | 5/2018 | Chen | G01S 19/23 |
| 10,393,882 | B2* | 8/2019 | Dai | G01S 19/29 |
| 10,801,069 | B2* | 10/2020 | Fischer | G01S 5/0226 |
| 11,125,889 | B2* | 9/2021 | Veitsel | G01S 19/30 |
| 11,156,724 | B2* | 10/2021 | Kishimoto | G01S 19/235 |
| 2006/0282216 | A1* | 12/2006 | Robbins | G01C 21/28 701/472 |
| 2016/0234709 | A1* | 8/2016 | Fischer | G01S 5/0036 |

OTHER PUBLICATIONS

Communication pursuant to Article 94(3) EPC dated Oct. 5, 2021 for European Patent Application No. 17896280.9.

Liu Yanyan et al: "GLONASS phase bias estimation and its PPP ambiguity resolution using homogeneous receivers", GPS (Conference on Outdoor Advertising Research), Springer, Zurich, vol. 21, No. 2, Apr. 16, 2016 (Apr. 16, 2016), pp. 427-437, XP036195364.
Hakansson Martin et al: "Review of code and phase biases in multi-GNSS positioning", GPS (Conference on Outdoor Advertising Research), Springer, Zurich, vol. 21, No. 3, Oct. 21, 2016 (Oct. 21, 2016), pp. 849-860, XP036261653.
Holaschutz Donny et al: "Inter-frequency Bias Estimation for the GPS Monitor Station Network", GNSS 2008—Proceedings of the 21 ST International Technical Meeting of the Satellite Division of the Institute of Navigation (ION GNSS 2008), The Institute of Navigation, 8551 Rixlew Lane Suite 360 Manassas, VA 20109, USA, Sep. 19, 2008 (Sep. 19, 2008), pp. 2405-2415, XP056002811.
Yamada H et al: "Evaluation and Calibration of Receiver Interchannel Biases for RTK-GPS/GLONASS", GNSS 2010—Proceedings of the 23rd International Technical Meeting of the Satellite Division of the Institute of Navigation (ION GNSS 2010), The Institute of Navigation, 8551 Rixlew Lane Suite 360 Manassas, VA 20109, USA, Sep. 24, 2010 (Sep. 24, 2010), pp. 1580-1587, XP056000273.
A Al-Shaery et al: "An enhanced calibration method of GLONASS interchannel bias for GNSS RTK", GPS Solutions, Apr. 1, 2013 (Apr. 1, 2013), pp. 165-173, XP055164917.
Dmitry Kozlov et al: "Statistical Characterization of Hardware Biases in GPS+GLONASS Receivers", GPS 2000—Proceedings of the 13th International Technical Meeting of the Satellite Division of the Institute of Navigation (ION GPS 2000), The Institute of Navigation, 8551 Rixlew Lane Suite 360 Manassas, VA 20109, A, Sep. 22, 2000 (Sep. 22, 2000), pp. 817-826, XP056002442.

* cited by examiner

METHOD, DEVICE AND SERVER FOR ESTIMATION OF IFB CALIBRATION VALUE

TECHNICAL FIELD

This disclosure relates to a method, a device, and a server for estimating an inter frequency bias (IFB) calibration value when interferometric positioning is performed by using a signal from a positioning satellite (hereinafter, satellites that can be used for positioning are collectively referred to as "satellites").

BACKGROUND ART

In related art, interferometric positioning by a Real Time Kinematic (RTK) method is used to measure an object in a stationary state with a high precision.

It is expected that a high precision positioning of a moving object will be realized by applying this interferometric positioning by the RTK method to positioning of a moving object.

PTL 1 discloses a positioning terminal capable of shortening time of determination of integer ambiguity in interferometric positioning using positioning signals from satellites.

A reference station and the positioning terminal receive the positioning signals from the satellites (not shown) of global navigation satellite system (GNSS) when performing interferometric positioning.

It should be noted that GNSS is a generic term for satellite navigation systems having performance (accuracy and reliability) that can be used for civil aviation navigation such as global positioning system (GPS), Beidu, and GLONASS.

Unlike a GPS and Beidu in a CDMA system, in a FDMA GLONASS satellite system, transmission frequency for each satellite is different from each other.

Since group delay characteristic for each positioning terminal is different from each other, time (amount of delay) until transmission wave reaches a reception chip of the reference station and a reception chip of the positioning terminal is different from each other for each satellite.

This time difference has a non-negligible effect on the accuracy of a RTK calculation.

In the RTK calculation, it is necessary to calibrate an inter frequency bias (IFB), which is difference in an amount of delay between the reference station and the positioning terminal.

Since the IFB is almost linear with respect to a carrier wave frequency, the IFB can be calibrated using a slope.

The slope is determined according to a machine type of the reference station and a machine type of the positioning terminal.

The positioning terminal stores an IFB calibration value of the machine type of each reference station already installed before shipment.

The positioning terminal uses the stored IFB calibration value when performing the RTK calculation.

CITATION LIST

Patent Literature

PTL 1: Japanese Patent Unexamined Publication No. 10-253734

SUMMARY OF THE INVENTION

According to an aspect of the present disclosure, there is provided a method, a device, and a server, for estimation of an IFB calibration value capable of improving an accuracy of interferometric positioning when a reference station is newly installed after shipment of a positioning terminal.

According to the aspect of the present disclosure, an estimation method of the IFB calibration value is the estimation method of the IFB calibration value of the reference station by a device for determining coordinates of a moving object based on the positioning signals transmitted from a plurality of satellites, the estimation method includes acquiring information for specifying the reference station based on reference station data received from the reference station, determining whether or not the IFB calibration value of the reference station corresponding to the information for specifying the reference station is stored in a storage, and estimating the IFB calibration value of the reference station by using information obtained by a positioning calculation based on the positioning signals when the IFB calibration value of the reference station is not stored in the storage.

According to the aspect of the present disclosure, a device includes a receiver that receives positioning signals transmitted from a plurality of satellites and a processor that determines coordinates of a moving object based on the positioning signals, in which the processor acquires information for specifying a reference station based on reference station data received from the reference station, determines whether or not an IFB calibration value of the reference station corresponding to the information for specifying the reference station is stored in a storage, and when the IFB calibration value of the reference station is not stored in the storage, estimates the IFB calibration value of the reference station by using information obtained by a positioning calculation based on the positioning signals.

According to the aspect of the present disclosure, a server includes a communicator that communicates with each of a plurality of devices that determine the coordinates of a moving object based on the positioning signals transmitted from a plurality of satellites and processor, in which the processor when the communicator receives the information for specifying the reference station from the device that has estimated the IFB calibration value of the reference station and the IFB calibration value of the reference station, calculates an average value of the IFB calibration values of the reference station and causes the communicator to transmit the information for specifying the reference station and the average value of the IFB calibration values of the reference station to another device.

According to the aspect of the present disclosure, it is possible to improve the accuracy of interferometric positioning when a reference station is newly installed after the shipment of the positioning terminal.

DESCRIPTION OF EMBODIMENTS

Hereinafter, embodiments of the present disclosure will be described in detail with reference to the drawings as appropriate.

However, more detailed description than necessary may not be described, in some cases.

For example, detailed description of already well-known matters and redundant description of substantially the same configuration may not be repeated, in some cases.

This is to avoid unnecessary redundancy in the following description and to facilitate understanding by those skilled in the art.

It should be noted that the attached drawings and the following description are provided to enable those skilled in the art to fully understand the present disclosure, and are not intended to limit the claimed subject matter.

<Configuration of the Positioning System>

First, the configuration of positioning system 1 according to the present embodiment will be described with reference to FIG. 1.

Figure 1:
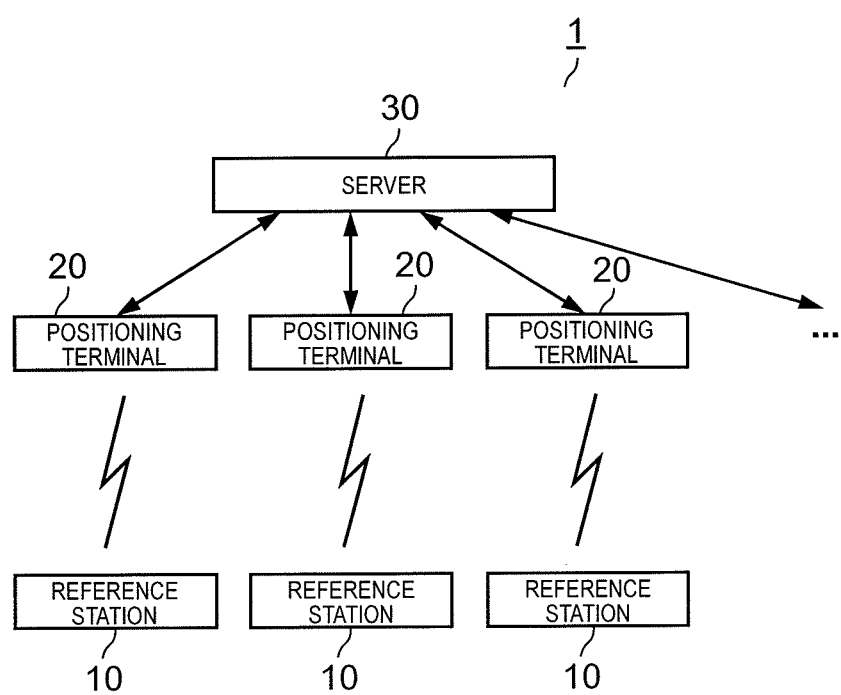
FIG. 1 is a diagram showing a configuration of a positioning system according to an embodiment.

As shown in FIG. 1, positioning system 1 includes reference station 10, positioning terminal 20, and server 30.

Positioning system 1 measures a position of positioning terminal 20 and obtains coordinates of positioning terminal 20 on the earth.

The coordinates are generally three-dimensional coordinates of latitude, longitude, and altitude, for example, but may be two-dimensional coordinates such as latitude and longitude.

Reference station 10 is installed by a local government such as a country, at a position where the coordinates on the earth are known.

Reference station 10 generates positioning data that is information indicating a phase of a carrier wave in reference station 10 (hereinafter, referred to as "reference station-positioning data") based on the positioning signals received from a satellite, and transmits reference station data including the reference station-positioning data to positioning terminal 20.

The details of the positioning data will be described below.

The reference station data includes, in addition to the reference station-positioning data, a unique machine type ID which is information for specifying reference station 10, information indicating the coordinates of the installation location of reference station 10, and the like.

Positioning terminal 20 is installed on a moving object (for example, vehicle or the like) to be target for which the coordinates are to be obtained.

Positioning terminal 20 includes a dedicated terminal for positioning, a personal computer having a positioning function, a smartphone, a tablet, and the like.

Positioning terminal 20 generates positioning data of positioning terminal 20 (hereafter referred to as "positioning terminal-positioning data"), which is information indicating the phase of the carrier wave in positioning terminal 20 based on the positioning signals received from the satellite.

Positioning terminal 20 stores a machine type ID of each reference station 10 already installed and its IFB calibration value in association with each other.

In addition, positioning terminal 20 receives the machine type ID and an IFB calibration value of the newly installed reference station 10 from server 30, and stores them.

Positioning terminal 20 performs RTK calculation (interferometric positioning processing by RTK method) by using the reference station-positioning data, the positioning terminal-positioning data, and the IFB calibration value, and outputs the coordinates of the moving object.

When positioning terminal 20 does not store the IFB calibration value corresponding to the machine type ID of reference station 10 of the received reference station data, and cannot receive the IFB calibration value corresponding to the machine type ID of reference station 10 from server 30, positioning terminal 20 performs an estimation processing of the IFB calibration value.

The details of the estimation processing of the IFB calibration value will be described below.

When server 30 communicates with each of a plurality of positioning terminals, and receives the machine type ID and the IFB calibration value of reference station 10 from any of positioning terminals 20, server 30 transfers the machine type ID and the IFB calibration value of reference station 10 to the other positioning terminal 20.

<Configuration of the Reference Station>

Next, the configuration of reference station 10 according to the present embodiment will be described with reference to FIG. 2.

Figure 2:
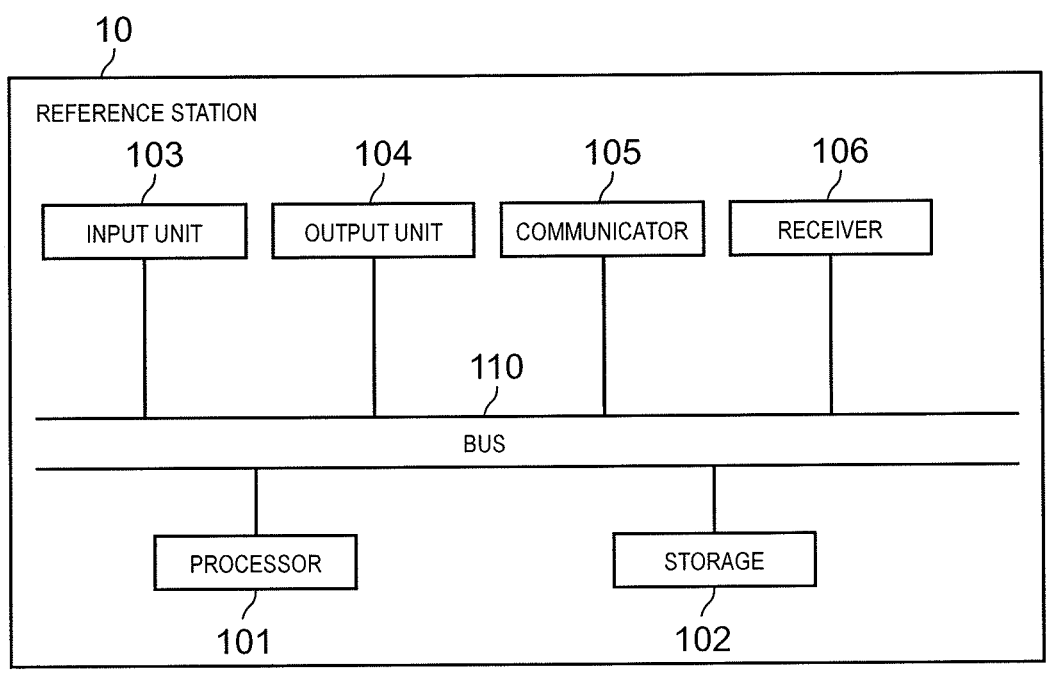
FIG. 2 is a block diagram showing a configuration of a reference station according to an embodiment.

As shown in FIG. 2, reference station 10 includes processor 101, storage 102, input unit 103, output unit 104, and communicator 105, receiver 106, and bus 110.

Processor 101 controls other elements of reference station 10 through bus 110.

For example, a general-purpose central processing unit (CPU) is used as processor 101.

In addition, processor 101 executes a predetermined program to generate reference station-positioning data based on the positioning signal.

Storage 102 acquires various information from other elements, and temporarily or permanently stores the information.

Storage 102 is a generic term for so-called primary storage devices and secondary storage devices.

A plurality of storages 102 may be physically arranged.

For example, a direct random access memory (DRAM), a hard disk drive (HDD), and a solid state drive (SSD) are used as storage 102.

Input unit 103 receives information from the outside.

The information that input unit 103 receives from the outside includes information related to an input from the operator of reference station 10, and the like.

Input unit 103 may be configured by using an input interface such as a keyboard as an example.

Output unit 104 presents information to the outside.

The information presented by output unit 104 includes information on positioning, and the like.

Output unit 104 may be configured by using the existing output interface such as a display as an example.

Communicator 105 communicates with an external device through a communication path.

Positioning terminal 20 is included in the device of the target (communication target) with which communicator 105 communicates.

As an example, communicator 105 may be configured by using a communication interface capable of communicating with an existing communication network such as a wireless LAN communication network or a 3G communication network.

Receiver 106 receives the positioning signals from the satellite and outputs the positioning signals to processor 101 through bus 110.

It should be noted that the configuration of reference station 10 described above is an example.

It may be configured by integrating some of each component of reference station 10.

It may be configured by dividing some of each component of reference station 10 into a plurality of elements.

Some of each component of reference station 10 may not be used.

Reference station 10 may be configured by adding other elements.

<Configuration of Positioning Terminal>

Next, the configuration of positioning terminal 20 according to the present embodiment will be described with reference to FIG. 3.

Figure 3:
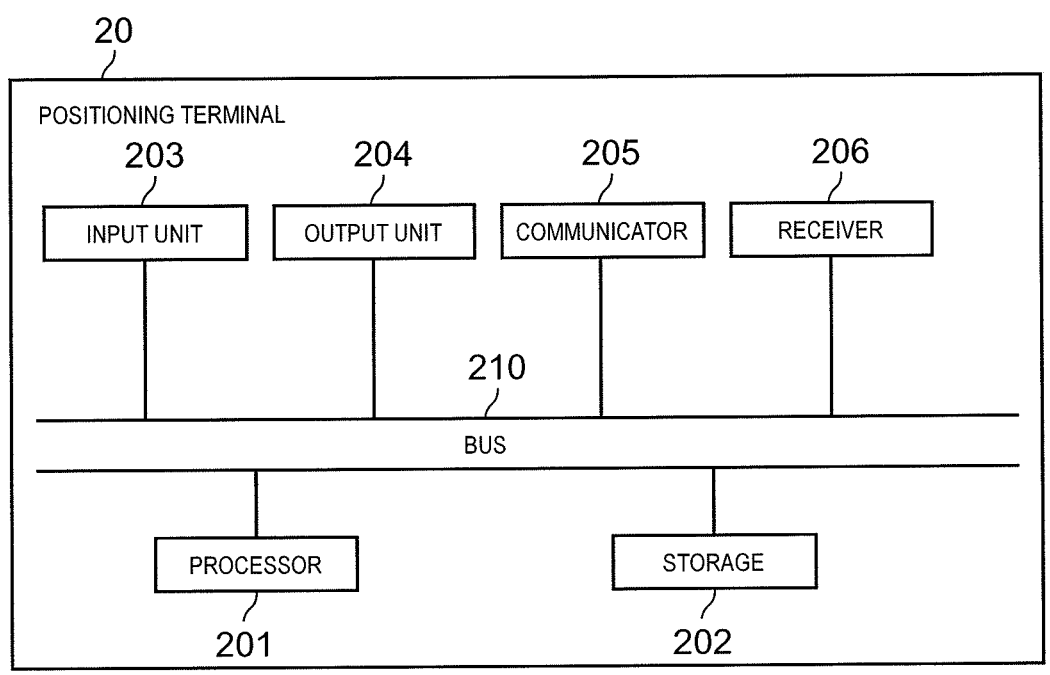
FIG. 3 is a block diagram showing a configuration of a positioning terminal according to an embodiment.

As shown in FIG. 3, positioning terminal 20 includes processor 201, storage 202, input unit 203, output unit 204, and communicator 205, receiver 206, and bus 210.

Processor 201 controls the other elements of positioning terminal 20 through bus 210.

For example, a general-purpose CPU is used as processor 201.

In addition, processor 201 generates positioning terminal-positioning data based on the positioning signals by executing a predetermined program.

In the present embodiment, processor 201 has a function to perform RTK calculation by using the reference station-positioning data, the positioning terminal-positioning data, and the IFB calibration value, and outputs the coordinates of the moving object.

Further, in the present embodiment, processor 201 has a function of performing the estimation processing of the IFB calibration value using the reference station-positioning data, the positioning terminal-positioning data, and candidates for the IFB calibration (including the initial value).

When processor 201 does not store the IFB calibration value corresponding to a machine type ID of reference station 10 of the received reference station data, and cannot receive the IFB calibration value corresponding to the machine type ID of reference station 10 from server 30, processor 201 performs an estimation processing of the IFB calibration value.

Storage 202 acquires various information from other elements, and temporarily or permanently stores the information.

Storage 202 is a generic term for so-called primary storage devices and secondary storage devices.

A plurality of storages 202 may be physically arranged.

For example, a DRAM, an HDD, or an SSD are used as storage 202.

In particular, in the present embodiment, storage 202 stores the machine type ID and the IFB calibration value of reference station 10 in association with each other.

Further, in the present embodiment, storage 202 stores the IFB calibration initial value and the fixed value.

Input unit 203 receives information from the outside.

The information that input unit 203 receives from the outside includes information related to an input from the operator of positioning terminal 20, and the like.

Input unit 203 may be configured by using an input interface such as a keyboard as an example.

Output unit 204 presents information to the outside.

The information presented by output unit 204 includes information on positioning, and the like.

Output unit 204 may be configured by using the existing output interface such as a display as an example.

Communicator 205 communicates with an external device through a communication path.

The target device (communication target) with which communicator 205 communicates includes reference station 10 and server 30.

As an example, communicator 205 may be configured by using a communication interface capable of communicating with an existing communication network such as a wireless LAN communication network or a 3G communication network.

In particular, in the present embodiment, communicator 205 transmits the IFB calibration value of reference station 10 estimated by processor 201 to server 30 together with the machine type ID of the reference station, and receives the machine type ID of reference station 10 and the IFB calibration value from server 30.

Receiver 206 receives the positioning signals from the satellite and outputs the positioning signals to processor 201 through bus 210.

It should be noted that the configuration of positioning terminal 20 described above is an example.

It may be configured by integrating some of each component of positioning terminal 20.

It may be configured by dividing some of each component of positioning terminal 20 into a plurality of elements.

Some of each component of positioning terminal 20 may not be used.

Positioning terminal 20 may be configured by adding other elements.

<Server Configuration>

Next, the configuration of server 30 according to the present embodiment will be described with reference to FIG. 4.

Figure 4:
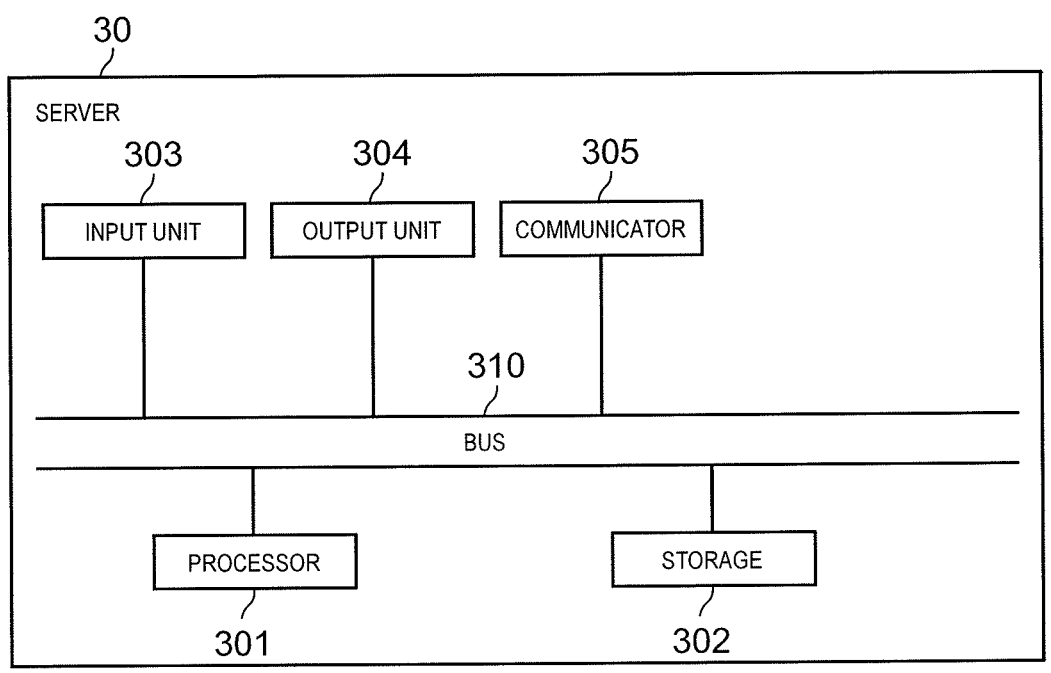
FIG. 4 is a block diagram showing a configuration of a server according to an embodiment.

As shown in FIG. 4, server 30 includes processor 301, storage 302, input unit 303, output unit 304, communicator 305, and bus 310.

Processor 301 controls other elements of server 30 through bus 310.

In particular, processor 301 causes storage 302 to store the machine type ID and the IFB calibration value of reference station 10 transmitted from one positioning terminal 20, and calculates an average value of the IFB calibration values.

Then, processor 301 causes communicator 305 to transmit the machine type ID and the average value of the IFB calibration values of reference station 10 (IFB calibration value when there is only one IFB calibration value stored) to the other positioning terminal 20.

When the number of the IFB calibration values stored in storage 302 at each reference station is equal to or greater than a predetermined value, processor 301 may cause communicator 305 to transmit the machine type ID and the average value of the IFB calibration value of the reference station 10 to the other positioning terminal 20.

Storage 302 acquires various information from other elements, and temporarily or permanently stores the information.

Storage 302 is a generic term for so-called primary storage devices and secondary storage devices.

A plurality of storages 302 may be physically arranged.

For example, the direct random access memory (DRAM), the hard disk drive (HDD), and the solid state drive (SSD) are used as storage 302.

In particular, in the present embodiment, storage 302 stores the machine type ID and the IFB calibration value of reference station 10 transmitted from positioning terminal 20 in association with each other.

Input unit 303 receives information from the outside.

The information that the input unit 303 receives from the outside includes information related to an input from the operator of server 30, and the like.

Input unit 303 may be configured by using an input interface such as a keyboard as an example.

Output unit 304 presents information to the outside.

The information presented by output unit 304 includes information on positioning, and the like.

Output unit 304 may be configured by using the existing output interface such as a display as an example.

Communicator 305 communicates with an external device through a communication path.

Positioning terminal 20 is included in the device of the target (communication target) with which communicator 305 communicates.

As an example, communicator 305 may be configured by using a communication interface capable of communicating with an existing communication network such as a wireless LAN communication network or a 3G communication network.

In particular, in the present embodiment, communicator 305 transmits the machine type ID and the IFB calibration value of reference station 10 transmitted from one positioning terminal 20 to the other positioning terminal 20.

It should be noted that the configuration of server 30 described above is an example.

It may be configured by integrating some of each component of server 30.

It may be configured by dividing some of each component of server 30 into a plurality of elements.

Some of each component of server 30 may not be used.

Server 30 may be configured by adding other elements.

In addition, server 30 according to the present disclosure includes a reference station installed by a local government such as a country.

<Positioning Data>

Next, positioning data will be described.

In the present embodiment, the positioning data includes pseudo distance information, carrier wave phase information, and Doppler frequency information.

The pseudo distance information is information on the distance between the satellite and own station (reference station 10 or positioning terminal 20).

A processor (processor 101 or processor 201) may calculate the distance between the satellite and own station by analyzing the positioning signals.

Specifically, the processor first obtains the travel time of the positioning signals based on the two pieces of information of (1) the phase difference between the pattern of the code carried by the positioning signals and the pattern of the code generated by the own station, and (2) the signal generation time of the satellite contained in the message (NAVDATA) contained in the positioning signals and the signal reception time of the own station.

Then, the processor obtains the distance between the satellite and the own station by multiplying the travel time by the speed of light.

This distance includes an error caused by the difference between the clock of the satellite and the clock of the own station, and the like.

The carrier wave phase information is the phase of the positioning signals received by the own station.

The positioning signals are a predetermined sine wave.

The processor may calculate the phase of the positioning signals by analyzing the received positioning signals.

The Doppler frequency information is information on the relative velocity between the satellite and the own station.

The processor may generate Doppler frequency information by analyzing the positioning signals.

As described above, positioning data is generated by processor 101 of reference station 10 and processor 201 of positioning terminal 20, respectively.

<RTK Calculation>

The RTK calculation will be described.

The RTK calculation is a calculation to execute an RTK method which is one of interferometric positioning.

In the RTK method, positioning of a predetermined point is performed by using carrier wave phase integrated value of the positioning signals transmitted by satellite.

The carrier wave phase integrated value is the sum of (1) the number of waves of the positioning signals from the satellite to a predetermined point and (2) the phase.

If the carrier wave phase integrated value could be obtained, since the frequency (and wavelength) of the positioning signals is already known, the distance from the satellite to the predetermined point would be obtained.

Since the number of waves of the positioning signals is unknown, it is referred to as integer value bias.

The important things in performing the RTK method are noise removal and estimation of integer value bias.

In the RTK method, the noise removal may be performed by calculating a difference referred to as double difference.

The double difference means the difference between values obtained by calculating the difference of the carrier wave phase integrated values of one receiver with respect to two satellites (single difference), with respect to each of two receivers (in the present embodiment, reference station 10 and a positioning terminal 20).

In the present embodiment, four or more satellites are used for positioning using the RTK method.

Therefore, the double difference is calculated by the number of combinations of four or more satellites.

In this calculation, the reference station-positioning data and the positioning terminal-positioning data are used.

In the RTK method, estimation of the integer value bias may be performed in various ways.

For example, estimation of the integer value bias may be performed by performing a procedure of (1) estimation of a float solution by the least square method and (2) test of a fixed solution based on the float solution.

The estimation of the float solution by the least square method is performed by generating a simultaneous equation by using a combination of double differences generated for each time unit and solving the generated simultaneous equation by the least square method.

The simultaneous equation is generated for each time unit referred to as epoch.

In this calculation, the reference station-positioning data, the positioning terminal-positioning data and the known coordinates of the reference station 10 are used.

The estimated value of the integer value bias obtained in this manner is referred to as a float solution (estimated solution).

While the float solution obtained as described above is a real number, the true value of the integer value bias is an integer.

Therefore, it is necessary to round off the float solution to an integer value.

However, a plurality of candidates may be considered for rounding off the float solution.

Therefore, it is necessary to test the correct integer value from among the candidates.

The solution which is considered to be somewhat accurate as an integer value bias by the test is referred to as a fixed solution (precise positioning solution).

In the present embodiment, a quality check is performed by using an ambiguity ratio (AR) value obtained by the RTK operation to check if the integer value is correct based on the result of the quality check.

Reference station-positioning data is used to streamline the narrowing down the candidates of integer value.

<Flows of Positioning Processing>

Figure 5:
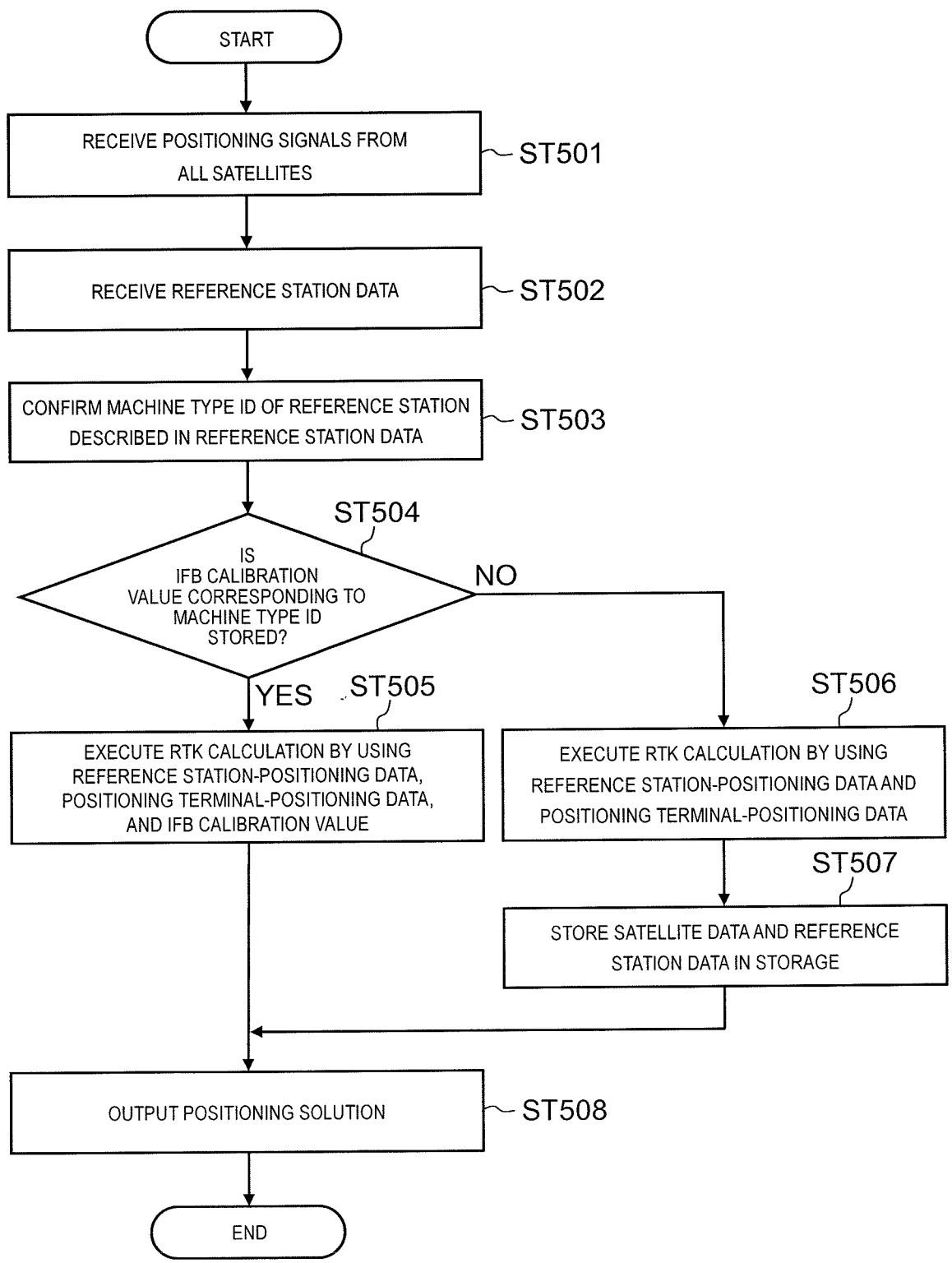
FIG. 5 is a flowchart showing a positioning processing according to an embodiment.

Next, the flow of the positioning processing according to the present embodiment will be described with reference to FIG. 5.

In the present embodiment, an example in which positioning terminal 20 performs positioning processing will be described.

However, the positioning processing according to the present disclosure is not limited to that performed by positioning terminal 20, and may be executed by a general-purpose computer added to positioning system 1, for example.

It should be noted that, there is no limitation in particular with respect to the timing which the positioning processing is started.

For example, the positioning processing may be started when positioning terminal 20 is powered on.

In addition, the positioning processing may be started when a command to start the positioning processing is input by input unit 203 of positioning terminal 20.

First, in ST501, receiver 206 receives the positioning signals from each of all receivable satellites.

Further, in ST502, communicator 205 receives reference station data from reference station 10.

Next, in ST503, processor 201 acquires the machine type ID of reference station 10 described in the reference station data received by receiver 206.

Then, in ST504, processor 201 confirms whether or not the IFB calibration value corresponding to the machine type ID of reference station 10 is stored in storage 202.

When the IFB calibration value corresponding to the machine type ID of reference station 10 is stored in storage 202 (ST 504: YES), in ST505, processor 201 executes RTK calculation by using the reference station-positioning data, the positioning terminal-positioning data, and the IFB calibration value and calculates a positioning solution (fixed solution or float solution).

Processor 201 confirms whether or not the AR value obtained by the RTK calculation is equal to or greater than a threshold value (for example, 3.0). When the AR value is equal to or greater than the threshold value, the processor 201 determines the positioning solution of the RTK calculation as the fixed solution (precise positioning solution). And, when the AR value is less than the threshold value, processor 201 determines the positioning solution of the RTK calculation as the float solution (estimated solution).

On the other hand, when the IFB calibration value corresponding to the machine type ID of reference station 10 is not stored in storage 202 (ST 504: NO), in ST506, processor 201 performs RTK calculation by using the reference station-positioning data and the positioning terminal-positioning data and calculates a positioning solution.

In addition, in ST507, processor 201 causes storage 202 to store the reference station-positioning data and the positioning terminal-positioning data.

After ST505 or after ST507, in ST508, output unit 204 outputs the positioning solution calculated by processor 201.

It should be noted that, this positioning solution represents current coordinates of the moving object in which positioning terminal 20 is installed.

<Flow of Estimation Processing of IFB Calibration Value>

Figure 6:
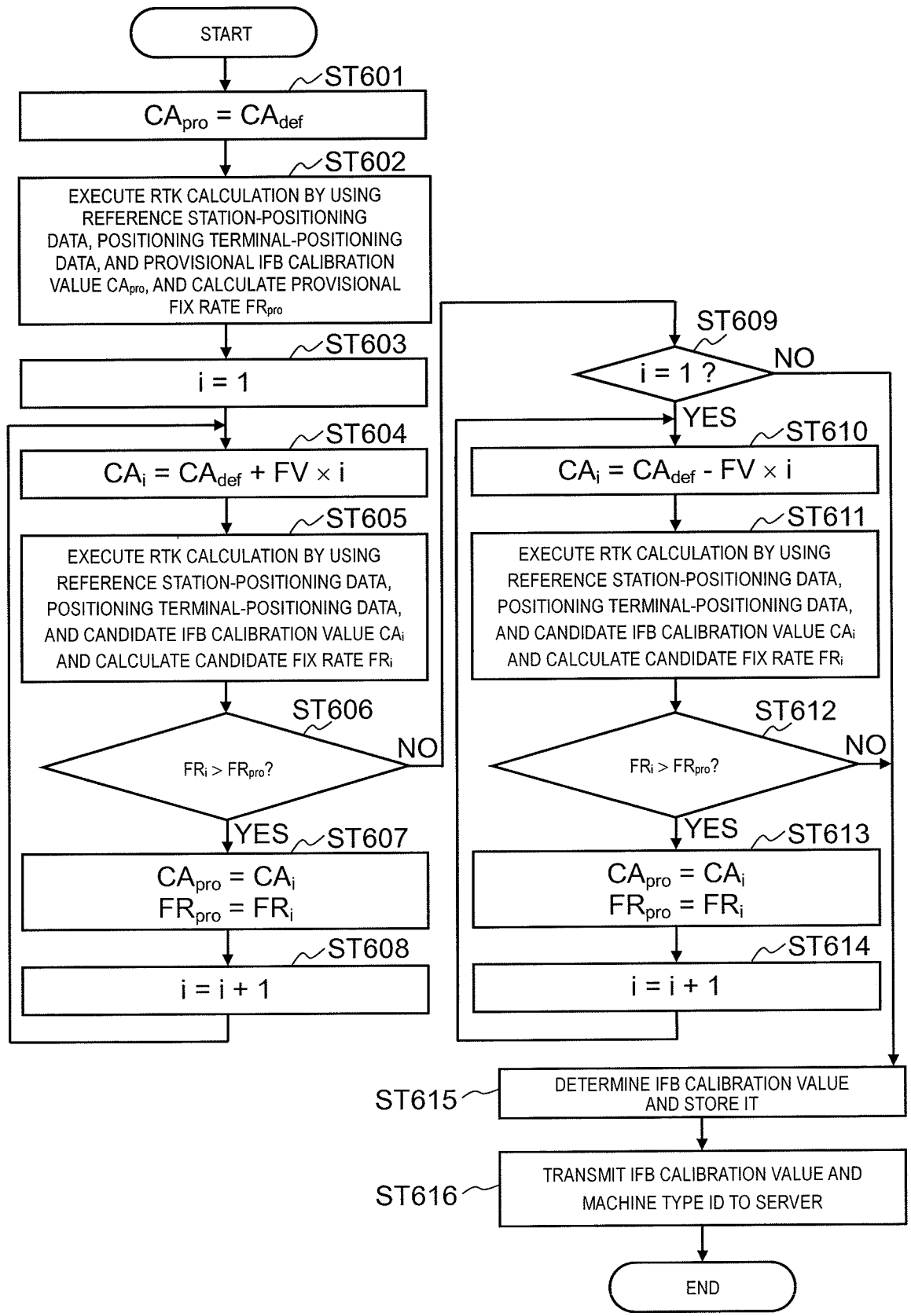
FIG. 6 is a flow chart showing an estimation processing of an IFB calibration value according to an embodiment.

Next, a flow of the estimation processing of an IFB calibration value according to the present embodiment will be described with reference to FIG. 6.

In the present embodiment, an example will be described in which positioning terminal 20 performs the estimation processing of the IFB calibration value.

However, the estimation processing of the IFB calibration value according to the present disclosure is not limited to that performed by the positioning terminal 20, and may be executed by a general-purpose computer added to server 30 or positioning system 1, for example.

In the above positioning processing, when the IFB calibration value corresponding to the machine type ID of reference station 10 is not stored in storage 202 (ST 504: NO), after the positioning processing is completed, the processor 201 executes the following IFB calibration value estimation processing.

First, in ST601, processor 201 acquires IFB calibration initial value $CA_{def}$ from storage 202, and sets it as provisional IFB calibration value CA $CA_{pro}$.

Next, in ST602, processor 201 executes RTK calculation by using reference station-positioning data, positioning terminal-positioning data, and provisional IFB calibration value $CA_{pro}$, and calculates provisional fix rate $FR_{pro}$ which is a rate of positioning solutions of which AR value is equal to or greater than a threshold value.

Next, in ST603 and ST604, processor 201 adds a value obtained by multiplying the fixed value FV by the number of steps i (i=1 at first) to IFB calibration initial value $CA_{def}$ and calculates candidate IFB calibration value $CA_i$.

Next, in ST605, processor 201 executes RTK calculation by using the reference station-positioning data, the positioning terminal-positioning data, and candidate IFB calibration value $CA_i$ and calculates fix rate $FR_i$.

Next, in ST606, processor 201 compares provisional fix rate $FR_{pro}$ with candidate fix rate $FR_i$.

When candidate fix rate $FR_i$ is greater than provisional fix rate $FR_{pro}$, that is, when performing RTK calculation using the candidate IFB calibration value $CA_i$ represents better performance (ST 606: YES), in ST607, processor 201 causes storage 202 to store candidate IFB calibration value $CA_i$ as provisional IFB calibration value $CA_{pro}$ and candidate fix rate $FR_i$ as provisional fix rate $FR_{pro}$.

Next, in ST608, processor 201 increments the number of steps i.

Thereafter, in ST606, the processing of ST604 to ST608 is repeated until candidate fix rate $FR_i$ becomes not greater than provisional fix rate $FR_{pro}$ (ST 606: NO).

In a case in which candidate fix rate $FR_i$ is not greater than provisional fix rate $FR_{pro}$ in ST606 (ST 606: NO), when the number of steps i is "1" (ST 609: YES), the flow proceeds to ST610, and when the number of steps i is not "1" (ST 609: NO), the flow proceeds to ST615.

In ST610, processor 201 subtracts the value obtained by multiplying the fixed value FV by the number of steps i, from IFB calibration initial value $CA_{def}$ and calculates candidate IFB calibration value $CA_i$.

Next, in ST611, processor 201 executes RTK calculation by using the reference station-positioning data, the positioning terminal-positioning data, and candidate IFB calibration value $CA_i$ and calculates fix rate $FR_i$.

Next, in ST612, processor 201 compares provisional fix rate $FR_{pro}$ with candidate fix rate $FR_i$.

When candidate fix rate $FR_i$ is greater than provisional fix rate $FR_{pro}$, that is, when performing RTK calculation using the candidate IFB calibration value $CA_i$ represents better performance (ST 612: YES), in ST613, processor 201 causes storage 202 to store candidate IFB calibration value $CA_i$ as provisional IFB calibration value $CA_{pro}$ and candidate fix rate $FR_i$ as provisional fix rate $FR_{pro}$.

Next, in ST614, processor 201 increments the number of steps i.

Thereafter, in ST612, the processing of ST610 to ST614 are repeated until candidate fix rate $FR_i$ becomes not greater than provisional fix rate $FR_{pro}$ (ST 612: NO).

In ST612, when candidate fix rate $FR_i$ is not greater than provisional fix rate $FR_{pro}$ (ST 612: NO), the flow proceeds to ST615.

In ST615, processor 201 determines provisional IFB calibration value $CA_{pro}$ as a formal IFB calibration value, associates it with the machine type ID of reference station 10, and causes storage 202 to stores it.

In addition, in step S616, communicator 205 transmits information including the IFB calibration value estimated by processor 201 and the machine type ID of reference station 10 corresponding thereto to server 30.

In the above description, although the case of performing the estimation processing of the IFB calibration value by using the fix rate has been described, in the present embodiment, the estimation processing of the IFB calibration value may be performed by using information indicating the accuracy of the positioning solution other than the fix rate.

Further, the estimation processing of the IFB calibration value may be performed by using information indicating performance other than the accuracy of the positioning solution, such as the convergence time.

Moreover, although the case in which the machine type ID was used as an example of the information for specifying the reference station was demonstrated in the above description, in the present embodiment, information other than the machine type ID may be used.

<Effect>

As described above, in the present embodiment, when the IFB calibration value of reference station 10 is not stored, positioning terminal 20 estimates the IFB calibration value of the reference station by using the information obtained by the positioning calculation based on the positioning signals.

Specifically, positioning terminal 20 uses the reference station-positioning data, the positioning terminal-positioning data, and the IFB calibration value candidate and calculates a positioning solution that indicates the coordinates of the moving object, and then estimates the IFB calibration value of reference station 10 based on the accuracy of the positioning solution for each of the candidates for the IFB calibration value.

In addition, the fix rate may be used as the accuracy of the positioning solution.

As a result, when a reference station is newly installed after shipment of a positioning terminal, interferometric positioning can be performed by using the estimated IFB calibration value of the reference station, so that the accuracy of interferometric positioning can be improved.

Further, in the present embodiment, positioning terminal 20 transmits the information for specifying reference station 10 and the estimated IFB calibration value of reference station 10 to server 30.

Server 30 calculates an average value of the received IFB calibration values of reference station 10, and transmits the information for specifying reference station 10 and the average value of IFB calibration values of reference station 10 to the other positioning terminal 20.

As a result, when a reference station is newly installed after the shipment of a positioning terminal, the IFB calibration value of the reference station estimated at one positioning terminal can be shared by other positioning terminals.

Further, in the present embodiment, when the number of IFB calibration values for each reference station 10 is equal to or greater than a predetermined value, server 30 causes positioning terminal 20 to transmit the information for specifying reference station 10 and the average value of the IFB calibration values.

In this case, positioning terminal 20 determines whether or not the IFB calibration value corresponding to the information for specifying reference station 10 may be acquired from server 30, and when it may not be acquired from server 30, estimates the IFB calibration value.

As a result, the accuracy of the estimated IFB calibration value of the reference station, which is used for interferometric positioning at each positioning terminal can be increased.

It should be noted that, in the present disclosure, the type, arrangement, and number of members are not limited to the embodiment described above, and the constituent elements can be appropriately changed without departing from the scope of the present invention, such as appropriately substituted with ones having the same function and effect.

Although in the above embodiment, the case of performing RTK calculation as an example of positioning calculation has been described, the present disclosure is not limited thereto, and may perform positioning calculation other than RTK calculation.

INDUSTRIAL APPLICABILITY

This present disclosure is suitable for use when interferometric positioning is performed by using signals from a positioning satellite.

REFERENCE MARKS IN THE DRAWINGS

1 POSITIONING SYSTEM
10 REFERENCE STATION
20 POSITIONING TERMINAL
30 SERVER
101, 201, 301 PROCESSOR
102, 202, 302 STORAGE
103, 203, 303 INPUT UNIT
104, 204, 304 OUTPUT UNIT
105, 205, 305 COMMUNICATOR
106, 206 RECEIVER
110, 210, 310 BUS

The invention claimed is:

1. An estimation method of an inter frequency bias (IFB) calibration value of a reference station by a device for determining coordinates of a moving object based on positioning signals transmitted from a plurality of satellites, the estimation method comprising:

acquiring information for specifying the reference station based on reference station data received from the reference station;

determining whether or not the IFB calibration value of the reference station corresponding to the information for specifying the reference station is stored in a storage;

when the IFB calibration value of the reference station is not stored in the storage, estimating the IFB calibration value of the reference station by using information obtained by a positioning calculation based on the positioning signals;
calculating a positioning solution indicating the coordinates of the moving object by using:
three or more satellite signals,
positioning data included in the reference station data, and
candidates for the IFB calibration value; and
estimating the IFB calibration value of the reference station based on accuracy of the positioning solution for each of the candidates for the IFB calibration value.

2. The estimation method of an IFB calibration value of claim 1,
wherein the accuracy of the positioning solution is a fix rate which is a rate of the positioning solution having a quality value that is equal to or greater than a threshold value.

3. The estimation method of an IFB calibration value of claim 1,
wherein the information for specifying the reference station and the estimated IFB calibration value of the reference station are transmitted to a server.

4. The estimation method of an IFB calibration value of claim 1, further comprising:
when the IFB calibration value of the reference station is not stored in the storage, determining whether or not the IFB calibration value corresponding to the information for specifying the reference station is acquirable from a server; and
when not acquirable from the server, estimating the IFB calibration value of the reference station.

5. A device comprising:
a receiver that receives positioning signals transmitted from a plurality of satellites; and
a processor that determines coordinates of a moving object based on the positioning signals,
wherein the processor
acquires information for specifying a reference station based on reference station data received from the reference station,
determines whether or not an inter frequency bias (IFB) calibration value of the reference station corresponding to the information for specifying the reference station is stored in a storage,
when the IFB calibration value of the reference station is not stored in the storage, estimates the IFB calibration value of the reference station by using information obtained by a positioning calculation based on the positioning signals,
calculates a positioning solution indicating the coordinates of the moving object by using:
three or more satellite signals,
positioning data included in the reference station data, and
candidates for the IFB calibration value, and
estimates the IFB calibration value of the reference station based on accuracy of the positioning solution for each of the candidates for the IFB calibration value.

6. The device of claim 5,
wherein the accuracy of the positioning solution is a fix rate which is a rate of the positioning solution having a quality value that is equal to or greater than a threshold value.

7. The device of claim 5, further comprising:
a communicator that transmits the information for specifying the reference station and the estimated IFB calibration value of the reference station to a server.

8. The device of claim 5,
wherein, the processor,
when the IFB calibration value of the reference station is not stored in the storage, determines whether or not the IFB calibration value corresponding to the information for specifying the reference station is acquirable from a server, and,
when not acquirable from the server, estimates the IFB calibration value of the reference station.

9. A server comprising:
a communicator that communicates with each of a plurality of devices that determine coordinates of a moving object based on positioning signals transmitted from a plurality of satellites; and
a processor,
wherein, the processor,
when the communicator receives information for specifying a reference station and inter frequency bias (IFB) calibration values of the reference station from a device that has estimated the IFB calibration values of the reference station, calculates an average value of the IFB calibration values of the reference station, and
causes the communicator to transmit the information for specifying the reference station and the average value of the IFB calibration values of the reference station to another device,
wherein the estimated IFB calibration values of the reference station is obtained by:
calculating a positioning solution indicating the coordinates of the moving object by using:
three or more satellite signals,
positioning data included in the reference station data, and
candidates for the IFB calibration value, and
estimating the IFB calibration values of the reference station based on accuracy of the positioning solution for each of the candidates for the IFB calibration value.

10. The server of claim 9,
wherein, the processor,
when a number of the IFB calibration values in each reference station is equal to or greater than a predetermined value, causes the communicator to transmit the information for specifying the reference station and the average value of the IFB calibration values of the reference station to another device.

* * * * *